United States Patent
Fritz et al.

(10) Patent No.: US 9,259,083 B1
(45) Date of Patent: Feb. 16, 2016

(54) COUNTERTOP AND METHOD OF MANUFACTURING THE SAME

(71) Applicant: Evolve Manufacturing, LLC, Winchester, VA (US)

(72) Inventors: Gregory Fritz, Winchester, VA (US); Joseph Bohm, Chesapeake Beach, MD (US)

(73) Assignee: EVOLVE MANUFACTURING, LLC, Winchester, VA (US)

( * ) Notice: Subject to any disclaimer, the term of this patent is extended or adjusted under 35 U.S.C. 154(b) by 49 days.

(21) Appl. No.: 14/321,444

(22) Filed: Jul. 1, 2014

(51) Int. Cl.
| | |
|---|---|
| A47B 77/02 | (2006.01) |
| B29C 39/02 | (2006.01) |
| B29C 39/12 | (2006.01) |
| A47B 13/08 | (2006.01) |

(52) U.S. Cl.
CPC ............. *A47B 77/022* (2013.01); *A47B 13/086* (2013.01); *A47B 2200/0001* (2013.01); *A47B 2200/001* (2013.01); *B29C 39/025* (2013.01); *B29C 39/12* (2013.01); *B29C 39/123* (2013.01)

(58) Field of Classification Search
CPC .... A47B 77/022; A47B 13/086; A47B 96/18; A47B 2200/0001; A47B 2200/001; B29C 39/003; B29C 39/025; B29C 39/006; B29C 39/12; B29C 39/123; B29L 2007/002; B29L 2009/005; B29L 2023/06; B29L 2023/0691; B29K 2267/003; B29K 2467/003; B29K 2067/00; B29K 2067/003; B29K 2067/06
USPC .............. 428/323–325, 411.1, 413, 426, 457, 428/480, 537.1; 264/110, 112, 257, 255, 264/133

See application file for complete search history.

(56) References Cited

U.S. PATENT DOCUMENTS

| | | | |
|---|---|---|---|
| 7,198,833 B1 | 4/2007 | West | |
| 7,901,760 B2 * | 3/2011 | Runkel | ......................... 428/206 |
| 7,959,991 B1 | 6/2011 | West | |

* cited by examiner

*Primary Examiner* — Jason L Vaughan
(74) *Attorney, Agent, or Firm* — Robert R. Axenfeld

(57) ABSTRACT

A solid-surface article may include a surface layer including at least one of gel coat, epoxy, glass, silicone, diamonds, and mica. The article may also include a sub-layer including a resin, curing agent, a color pigment, and resin filler/fillers. The composite article may resemble a countertop, such as granite, marble, polished concrete, quartz, glass, laminate, wood, stone, and copper countertops.

7 Claims, 1 Drawing Sheet

COUNTERTOP AND METHOD OF MANUFACTURING THE SAME

TECHNICAL FIELD

The following disclosure is directed, in general, to countertops having surfaces that include predetermined aesthetic designs or resemble naturally-occurring elements.

BACKGROUND

A countertop usually refers to a horizontal surface in kitchens, furniture, bathrooms, or other table surfaces. It is frequently installed on and supported by a cabinet framework. The surface of a countertop is typically positioned at an optimal height for which the countertop is designed. The surface of a countertop may be constructed of various materials with different attributes and aesthetics.

For example, countertop surfaces may be natural such as granite, quartz, onyx, marble, sandstone, bluestone, limestone and other natural materials. Countertop surfaces may also include materials that are artificial, such as, concrete, laminate, acrylic or other manmade materials with various colors and patterns.

Traditional countertops—whether natural or artificial—are often heavy, and require professional installers for installation. For instance, for natural materials, specialized equipment is required to cut, measure, and polish the materials, such as granite. In addition, granite slabs are exceptionally heavy, and require upright-vertical positioning when not supported horizontally to prevent the slabs from cracking or breaking. And typically, at least two people are required to transport, and install the slabs as countertops.

Likewise, laminate and similar countertops are heavy and awkward to maneuver. In addition, these countertops have other drawbacks. For instance, to fit and install these countertops requires special tools, and bonding agents. Moreover, the bonding agents emit noxious fumes. So, plenty of ventilation is required when applying the bonding agents, and during the curing process. Further, the overall process of installing laminate countertops is usually time consuming, and better left to experienced installers.

SUMMARY

One aspect provides a method for forming a countertop. In one example, the method includes providing a base material that may include resin, a coloring pigment, a catalyst, microspheres and resin filler (i.e., such as calcium carbonate, wood, sand, mica, fiberglass, fly ash, and other suitable materials). The base material is mixed and dispensed into a mold and cured. A surface layer may or may not be formed on the base material after curing. The surface layer may include: any gel coat, epoxy, glass, urethane, diamonds, and mica. The base material is removed from the mold (either before or after the surface layer is formed) and is applied to a backing. The base material and backing form a single-unitary countertop, with the base material forming a layer of the countertop.

Another aspect provides a method of manufacturing a countertop. In this example, the method includes providing a base material that may include fiberglass strands, in addition to resin, color pigment, a catalyst, microspheres, and/or fillers mentioned above. The base material is mixed and dispensed into a mold and cured. After curing and removal from the mold, and resembles a countertop such as granite, marble, polished concrete, quartz, glass, laminate, wood, stone, or copper countertops.

Yet another aspect provides a solid-surface article. In one example, the article may include a surface layer including at least one of gel coat, epoxy, glass, urethane, diamonds, and mica. The latter two materials may be added to the surface layer for additional strength, abrasion resistance, and cosmetic/decorative appearance. Although the diamonds and mica are not necessarily limited to the surface layer. The article may also include a sub-layer including a resin, curing agent, a color pigment, and resin filler. The composite article resembles a countertop, such as granite, marble, polished concrete, quartz, glass, laminate, wood, stone, and copper countertops.

This summary is provided to introduce a selection of concepts in a simplified form that are further described below. This summary is not necessarily intended to identify key features or essential features of the claimed subject matter, nor is it necessarily intended to be used as an aid in determining the scope of the claimed subject matter.

Reference herein to "example," "embodiments" or similar formulations means that a particular feature, structure, operation or characteristic described in connection with the example, is included in at least one implementation in this description. Thus, the appearance of such phrases or formulations herein are not necessarily all referring to the same example. Further, various particular features, structures, operations, or characteristics may be combined in any suitable manner in or more examples.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items. The figures are not necessarily drawn to scale.

DETAILED DESCRIPTION

As mentioned above, conventional countertops are heavy, cumbersome to transport, as well as challenging and time consuming to install. In fact, installation of most countertops requires professional installers with dedicated-specialty tools.

The present disclosure recognizes these drawbacks and introduces new composite countertops made of a hybrid-plastic material, which is extremely lightweight, and resilient. Indeed, the countertops can be fabricated to resemble most popular countertops made of natural or manmade material, including, stone granite, concrete, quartz, onyx, marble, sandstone, bluestone, limestone, and laminate.

Further, due to the light weight properties and resiliency of the new countertops, a professional installer is generally not required to install these countertops. As a matter of fact, only basic tools are needed to cut and install these countertops. Hence the duration and complexity of countertop installations is substantially reduced. Moreover, the costs of installations for these new countertops are substantially reduced when compared to conventional countertops.

Figure 1:
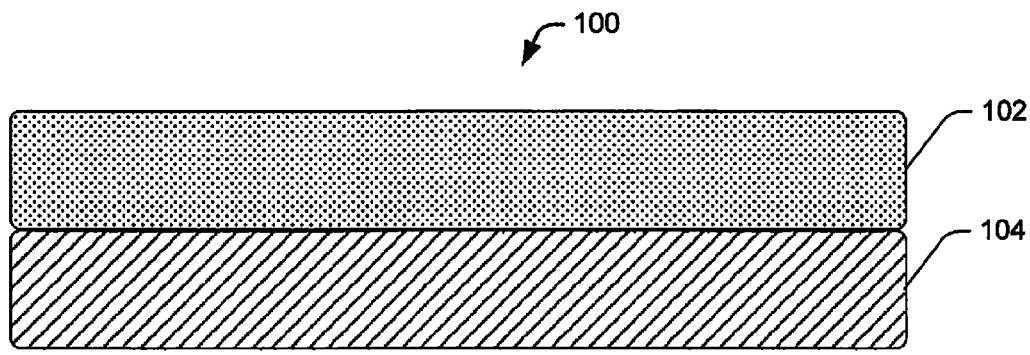
FIG. 1 is a schematic cross-sectional view of an example solid-surface-composite article.

Turning to FIG. 1, is a schematic cross-sectional view of an example solid-surface-composite article 100. In one example, article 100 is a countertop.

In this disclosure, the term "countertop" generally refers to an upper (or functioning) horizontal surface of a counter or table, including a kitchen counter, a bathroom counter, a top of a display counter, a conference-room table, a top of a storage case, or other resting and working surfaces.

Although the examples in this disclosure will generally refer to countertops, the principles of this disclosure are not limited to countertops, and may apply to other applications, including, but not limited to, furniture surfaces, tile/slab materials, panels for cabinets, walls, or display cases, and so forth.

In one example, article 100 includes a first layer 102 and a second layer 104. First layer 102 is generally a plastic resin having a composition to be described in more detail below. Layer 102 is generally curable and may be molded into a desired countertop shape. Although not shown in FIG. 1, first layer may include a filler of predetermined proportions as determined by a person skilled in the art. The filler may include any organic or inorganic materials suitable for the application of the countertop.

In one example, layer 102 is about a ½ inch to an inch in height. However, as appreciated by those skilled in the art, configurations of a counter may vary, including other suitable ranges greater or less than ½ inch or 1 inch in height.

Layer 104 serves as a structural-backing layer to increase rigidity strength of article 100. Layer 104 may be thicker, of equal thickness to, or thinner than layer 102. In one example, layer 104 is generally from about a ⅛ to ¾ inches thick, and other suitable sizes are possible. Layer 104 may be composed of CDX, OSB, wire, metal, plastic sheeting, fiberglass, mesh, and/or other materials. Further, layer 104 may include the same materials as layer 102 including filler materials.

Layer 104 may be attached, directly or indirectly, to layer 102. As appreciated by those skilled in the art, any suitable attachment means may be used to fasten layer 102 to layer 104, including commercial adhesives, glue, epoxy, or mechanical mechanisms, such as screws, clamps or a combination of the aforementioned.

Layer 102 may also include other materials embedded therein to increase strength. The exact ingredients, amounts, and particle sizes may vary depending on desired strength and appearance desired.

Figure 2:
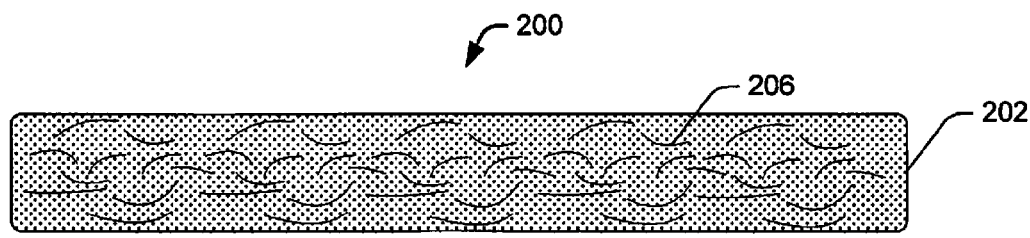
FIG. 2 is a schematic cross-sectional view of another example solid-surface-composite article.

For example, FIG. 2 is a schematic cross-sectional view of another example solid-surface-composite article 200 similar to article 100 in FIG. 1. However, as depicted in FIG. 2, article 200 includes no backing such as layer 104 depicted in FIG. 1. Referring to FIG. 2, the strength of layer 202 is increased through the use of strands 206 embedded in layer 202. Strands 206 may be formed of fiberglass or other suitable materials, including, but not limited to, chopped fiberglass strands, wood fiber/strands, mica, crushed stone, and crushed glass.

The proportion of strands 206 may vary depending on the amount of overall mixture used to mold layer 202. In one example, the amount of strands is about within the range of about two-to-four percent of approximately 30 pounds of mix (to be described). However, as appreciated by those skilled in the art after having the benefit of this disclosure, other amounts of strands, greater or less, may be included depending on strength desired for layer 202.

Figure 3:
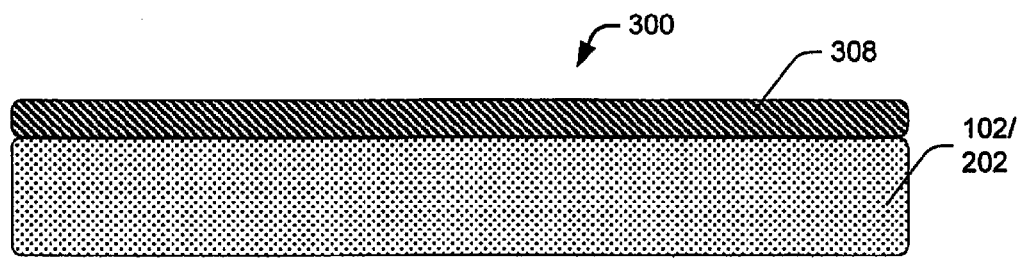
FIG. 3 is a schematic cross-sectional view of another example solid-surface-composite article including a surface layer.

Other layers may be included in forming articles 100 or 200. For instance, FIG. 3 is a schematic cross-sectional view of another example solid-surface-composite article 100/200 (FIGS. 1 and 2) having a surface layer 308 in addition to a first layers 102/202, and a potential backing 104. Referring to FIG. 3, surface layer 308 may include an epoxy, gel coat, urethane, UV resistant additives In addition to epoxy or gel coating, surface layer 308 may also include other materials, such as mica, glass, nano diamonds (to increase scratch resistance), sand, and crushed stoneand other suitable materials as appreciated by those skilled in the art after having the benefit of this disclosure. For home and kitchen applications, layer 308 should meet FDA standards for food or housewares.

Surface layer 308 may be applied to layer 102, 202 before layer 102, 202 is packed into a mold (to be described), while in the mold, or after the materials comprising layer 102/202 are removed from mold. Surface layer 308 may also be applied in the field by installers, before or after installation of articles 100, 200. Surface layer 308 may be brushed or sprayed on, or one or more portions of layer 102/202 may be immersed in a liquid form of surface layer 308. An ultraviolet additive may also be added to surface layer 308 to expedite curing of the material when ultraviolet light is applied to layer 308. An autoclave, air bubbles, direct heat, vacuum chamber, or vibration device can also be used to expedite curing.

Figure 4:
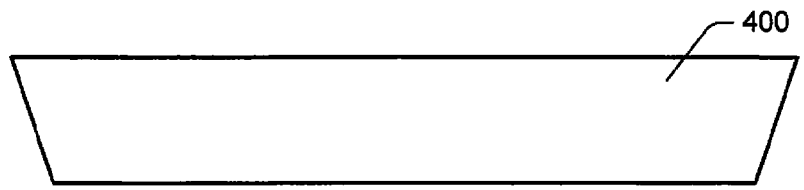
FIG. 4 depicts a side view of a mold for a countertop.

FIG. 4 depicts a side view of a mold 400 for a countertop. Mold 400 may be comprised of latex, silicone, urethane, glass, plastic, metal, a combination of the aforementioned materials, or other suitable materials. Molds are configured into the size and shape of the product desired. Edge profiles (not shown) may or may not be incorporated into the shape of the mold. For instance, edge profiles include, but are not limited to, square, half round, full round (bull nose), quarter round, OG edge, and so forth.

Materials comprising layers 102, 202 (including strands, if any) and surface layer 308 (if any) may be dispensed into mold 400 by hand or machine and pressed if needed. Large slabs may be made, then later cut to size and dimension. This would be representative of how blocks of stone are cut at a quarry. Different amounts of pressure/angle of pack/torque may be applied to achieve different results desired for the articles 100, 200. Mold removal may be performed manually, machine, or with the use of compressed air.

Articles 100, 200 may be installed with basic-power tools. Conventional means for installing products may include caulk/glue, and the use of traditional screws for additional connection between articles 100, 200 and fixtures (not shown) such as cabinets.

Articles 100, 200 may have a reduced weight and an enhanced workability as compared to a conventional composite solid surface of the same size. In addition, the composite solid surface article may be cut into a predetermined shape and size, so that it may be affixed to a supporting panel to form a composite solid surface structure. The composite solid surface structure may be, e.g., a wall, a table, a desk, a workstation, a countertop, a tub, and so forth, so that a kitchen, a bathroom, a building, and so forth may be built. The composite solid surface article may be affixed to the supporting panel by any means as determined by one of ordinary skill in the art, e.g., adhesive.

The material composition of layer 100, 200 is now described in more detail. Layers 100, 200 are curable compositions of resin and may be configured to resemble granite, marble, polished concrete, quartz, glass, laminate, wood, stone, copper, and other natural or artificial materials, patterns, and designs.

Composition of layer 100, 200 may be formed of thermoset and thermoplastic resin, a curing agent, microspheres, resin filler and or desired fillers, and additives. Thermoset resins may include, for example, polyester resins including isophthalate, orthophthalate and terephthalate polyester resins, polyethylene terephthalate resin, dicyclopentadiene resins (DCPD), vinyl ester resins and bisphenol resins. A curing agent is selected from materials that can initiate cross-linking of the chosen thermoset resin. Thus, polyester resins will typically use methyl ethyl ketone peroxide and a blend of CHP as needed as a curing agent while bisphenol resins will typically use an amine based curing agent. The amount of curing agent used is dependent on the amount of thermoset resin used in the composition. For some thermoset resins such as polyester resins, the amount of curing agent used may be varied to increase or decrease the cure time of the catalyzed base material. For example, about one percent curing agent is used per total mixture. If the percentage is increased, then the curing time should decrease inversely.

Microspheres and resin filler may include thin shell surrounding a hollow core. Typically, a microsphere is spherical. The shell may be formed of various materials such as for example, glass, silica, polymers, ceramics and alumina.

Microspheres typically have a particle size range of about 5 to about 400 microns. Because the microspheres have then shell surrounding a relatively large volume, they have a very low effective density that can be 0.2 g/cc or less. Some microsphere products include EXPANCEL products available from Nobel Industries, Q-CEL products available from the PQ Corporation, PM hollow sphere products available from the PQ Corporation and EXTENDOSPHERES products available from the PQ Corporation.

The additives are used to form layers 100, 200 with an appearance closely approximating the finished product in the form desired, such as stone, granite, marble, etc. In general, the additives can comprise one or more of dry temper colors, dry mortar, dyes, pigments, paint, wood ash, fly ash, mica, stone particles and glass particles. Preparation of layer 100, 200 material starts with providing predetermined amounts of resin, curing agent, microspheres, and/or resin filler. The amount of curing agent is based on the type of thermoset resin chosen, desired cure time, and the thickness of an object being formed. The amount of microspheres is typically in the range of about 8% to about 63% by weight of the resin. Variations the amount of microspheres is typically in the range of about 20% to about 55% by weight of the resin. In other advantageous variations the amount of microspheres is typically in the range of about 30% to about 45% by weight of the resin. The amounts of resin, curing agent and microspheres are chosen so that the resulting homogeneous mixture will have a suitable viscosity to form a catalyzed base material.

A catalyzed base material having a viscosity that is low may not be suitable for some materials while suitable for other. For example, a low viscosity may not work for achieving a suitable natural stone appearance, but may be suitable for achieving a copper look. On the other hand, a catalyzed base material having a viscosity that is too high may not be suitable. With some experience, a suitable catalyzed base material viscosity can be achieved without the need for measuring equipment.

In some embodiments a viscosity of about $950 \times 10^6$ to about $1590 \times 10^6$ cps (HB viscometer available from Brookfield Engineering of Middleboro, Mass., TE spindle, 1 rpm, factor 40 mm) may be suitable.

The order of mixing the resin, curing agent and microspheres to form a catalyzed base mixture can be varied depending on application. For example, the microspheres can be added to the resin and mixed at a first location to form a microsphere/resin premix. The premix can be shipped to a second location and mixed with the curing agent to form a catalyzed base material. Alternatively, the microspheres can be added to the curing agent and mixed at a first location to form a microsphere/curing agent premix. The microsphere/curing agent premix can be shipped to a second location and mixed with the resin to form a catalyzed base material. Or, some portion of the microsphere amount can be mixed with the resin and the remainder of the microsphere amount can be mixed with the curing agent at a first location to form two premixes. The premixes can be shipped to a second location and mixed to form a catalyzed base material. Naturally, the resin, curing agent and microspheres can be combined and mixed at a single location to form a catalyzed base material. Mixtures comprising microspheres are advantageously mixed slowly to blend the microspheres into the mixture while minimizing breakage of the microspheres. Mixing speed can be increased if the amount of microspheres added is also increased to account for breakage. Desired levels of product permeability can be achieved by mixing at a high speed and breaking the microspheres on purpose. Commercially available paddle mixers have been found suitable for mixing the catalyzed base material.

The microspheres may be homogeneously distributed in the catalyzed base material. As used herein a homogeneous distribution need not be mathematically precise but may be a generally homogeneous distribution as allowed by the selected mixing method. There is no need to eliminate air entrainment during mixing, but can be done if desired through the use of an air release additive, vacuum, or vibration to minimize air entrapment. In addition, air release additives may be used in high-viscosity mixes.

In one embodiment, an artificial material can advantageously be prepared directly at the point of use. Preparation of the material starts with adding the curing agent to the thermoset resin. The amount of thermoset resin used is determined by the amount of product needed. The amount of curing agent needed is based on the type of thermoset resin chosen, amount of thermoset resin, thickness of material being formed, and the desired cure time. This catalyzed resin mixture is thoroughly mixed by any suitable method. There is no need to eliminate air entrainment from this mixture. Microspheres are added by pouring directly over the top of the catalyzed resin mixture with generally homogeneous mixing to form the catalyzed base material.

The catalyzed base material is placed in a mixing container of suitable size. One or more of the additives are sprinkled over the catalyzed base material. Subsequently, the catalyzed base material and additives are "worked" or "lightly mixed" to incorporate the additives into the catalyzed base material to form the stone patterning. One method of working is to roll one or more of the additives onto the catalyzed base material. After rolling, pieces of catalyzed base material and additive are broken off and recombined onto other portions of the catalyzed base material. This breaking off and recombining process is repeated until the desired stone effect is achieved. Another working method that may be used separately or in addition to the above method is rolling the catalyzed base material in one or more of the additives and folding the rolled catalyzed base material/additives. The rolling and folding process is repeated until the desired stone effect is achieved. The additives may be added sequentially or all at once during working depending on the stone effect desired. This working or mixing step is surprisingly important and deviations from the disclosed procedure, even with the disclosed materials, may result in materials having an unsatisfactory appearance. It should be understood that the intent of this mixing step is to provide the catalyzed base material with spaced veins or layers of the additives and additive mixtures, thereby providing the look of a natural stone product. To this end, it is important that the additives are not smeared or homogenized completely into the catalyzed base mixture. For this reason, an acceptable natural stone product cannot be achieved if the catalyzed base material and additives are homogeneously mixed, for example using conventional methods such as stirring, shaking, paddle mixer, rotary mixer or cement mixer.

The catalyzed stone mixture can be packed into a flexible mold. After curing, the mold is removed to provide an artificial stone material closely approximating the look and texture of a natural stone. Alternatively, the catalyzed stone mixture can be transferred to a surface and sculpted. Appropriate tools such as spatulas, knives, etc. may also be used. After curing, the sculpted surface of the artificial stone material approximates the look and texture of a natural stone surface.

It should be appreciated that some composite articles and engineered products that may be manufactured at a centralized location under controlled conditions using specialized equipment and transported in a cured state to an installation site. Once at the installation site these products are fabricated in the cured state and installed onto a working surface such as a countertop. Naturally, the component materials can also be mixed at the point of use. The catalyzed mixture can be applied to a desired working surface at the point of use before curing. This allows the installer flexibility in fabrication and installation that is not possible with known materials.

For more examples of mixtures and compositions for layers 102, 202 reference is made to U.S. Pat. Nos. 7,959,991 and 7,198,833 to West, which are hereby incorporated by reference as if fully set forth in this disclosure.

Exemplary embodiments have been disclosed herein, and although specific terms are employed, they are used and are to be interpreted in a generic and descriptive sense only and not for purpose of limitation. For example, it will be understood that when a layer is referred to as being "on" another layer or substrate, it can be directly on the other layer or substrate, or intervening layers may also be present.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method for forming a countertop, comprising:
   in a first step:
   combining a thermoset resin, a curing agent, a coloring pigment, a filler of about eight percent to about 63 percent (by weight of thermoset resin) of microspheres homogeneously distributed within the thermoset resin;
   mixing the resin, the coloring pigment, curing agent, and microspheres to form a base material, wherein the base material has viscosity within the range of approximately $950 \times 10^6$ to approximately $1590 \times 10^6$ centipoise;
   dispensing the base material into a mold, wherein the mold is generally in the shape of at least a portion of the countertop;
   curing the base material; wherein the base material is opaque;
   removing the base material from the mold;
   in a second step, after the base material is cured and removed from the mold:
   applying the base material to a backing; and
   in a third step, at least after the base material is cured and removed from the mold:
   forming a surface layer directly on the base material including adding at least one of epoxy, urethane, and gel coat directly to the base material; wherein the base material, the backing and surface layer form a single-unitary countertop, wherein at least the cured base material resembles a countertop in the form of at least one of granite, marble, polished concrete, quartz, glass, laminate, wood, stone, and copper.

2. The method of claim 1, wherein the backing includes at least one of plywood, CDX, OSB, wire, metal, fiberglass plastic sheeting, and mesh.

3. The method of claim 1, wherein the coloring pigment includes at least one of paint, dye, mortar, stone dust, stone chips, and wood dust.

4. The method of claim 1, wherein the curing includes applying ultraviolet light to the base material or use of autoclave or direct heat.

5. The method of claim 1, further comprising adding
   fiberglass strands into the base material before the base material is cured.

6. The method of claim 5, wherein the countertop is at least one of a kitchen countertop, bathroom countertop, tabletop, vertical cladding, and horizontal cladding.

7. The method of claim 5, wherein the base material includes from about 2 to 20 percent by volume of the fiberglass strands per 30 lbs of base material.

* * * * *